(12) United States Patent
Tamura (10) Patent No.: US 9,735,682 B1
(45) Date of Patent: Aug. 15, 2017

(54) STEP-DOWN CIRCUIT (71) Applicant: KABUSHIKI KAISHA TOSHIBA, Tokyo (JP)

(72) Inventor: Motoki Tamura, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/250,816

(22) Filed: Aug. 29, 2016

(30) Foreign Application Priority Data

Mar. 15, 2016 (JP) ................................. 2016-051270

(51) Int. Cl.
*H02M 3/07* (2006.01)
*H02M 3/158* (2006.01)

(52) U.S. Cl.
CPC ............. *H02M 3/158* (2013.01); *H02M 3/07* (2013.01); *H02M 2003/072* (2013.01)

(58) Field of Classification Search
CPC .. H02M 3/07; H02M 3/073; H02M 2003/072; H02M 2003/075–2003/078
USPC .......................................................... 363/62
See application file for complete search history.

(56) References Cited

U.S. PATENT DOCUMENTS

| | | | | |
|---|---|---|---|---|
| 4,205,369 A | * | 5/1980 | Asano ..................... | H02M 3/07 363/62 |
| 4,841,427 A | * | 6/1989 | Miyazaki ................ | H02M 3/07 307/109 |
| 6,084,789 A | | 7/2000 | Van Lieshout | |
| 6,198,645 B1 | * | 3/2001 | Kotowski ............... | H02M 3/07 307/110 |
| 7,638,982 B2 | * | 12/2009 | Leong ..................... | H02M 3/07 307/109 |
| 7,696,807 B2 | | 4/2010 | Takahashi | |
| 8,035,713 B2 | | 10/2011 | Oike et al. | |
| 8,922,472 B2 | | 12/2014 | Yamamoto et al. | |
| 2002/0109540 A1 | * | 8/2002 | Meng ..................... | H02M 3/07 327/536 |

(Continued)

FOREIGN PATENT DOCUMENTS

| | | |
|---|---|---|
| JP | 2002506609 A | 2/2002 |
| JP | 4115358 B2 | 7/2008 |

(Continued)

*Primary Examiner* — Gary L Laxton
*Assistant Examiner* — Ivan Laboy Andino
(74) *Attorney, Agent, or Firm* — Patterson & Sheridan, LLP (57) ABSTRACT

A step-down circuit includes a first transistor of N-type having a channel between an input terminal and a first node, and a gate to which a reference voltage that is lower than a peak value of an AC voltage applied to the input terminal is applied, a second transistor of P-type having a channel between the input terminal and a second node, and a gate to which the reference voltage is applied, a third transistor of N-type having a channel between the first node and an output terminal, and a gate to which the AC voltage is applied, a fourth transistor of P-type having a channel between the second node and the output terminal, and a gate to which the AC voltage is applied, a first capacitor connected between the first node and the second node, and a second capacitor connected between the output terminal and a reference potential terminal.

19 Claims, 7 Drawing Sheets

(56) References Cited

U.S. PATENT DOCUMENTS

| | | | | |
|---|---|---|---|---|
| 2006/0082409 | A1* | 4/2006 | Kobayashi | H02M 3/07 327/536 |
| 2007/0194834 | A1* | 8/2007 | Sohara | H02M 3/07 327/536 |
| 2009/0066407 | A1* | 3/2009 | Bowman | H02M 3/07 327/536 |
| 2009/0072800 | A1* | 3/2009 | Ramadass | H02M 3/07 323/271 |
| 2011/0128762 | A1* | 6/2011 | Ripley | H02M 3/06 363/62 |
| 2011/0204724 | A1* | 8/2011 | Verma | H02M 3/07 307/109 |
| 2014/0043864 | A1* | 2/2014 | Kroekenstoel | H02M 3/156 363/17 |
| 2014/0070787 | A1* | 3/2014 | Arno | H02M 3/07 323/304 |

FOREIGN PATENT DOCUMENTS

| | | |
|---|---|---|
| JP | 4987447 B2 | 7/2012 |
| JP | 5181737 B2 | 4/2013 |
| JP | 2013106121 A | 5/2013 |

* cited by examiner

| | No. | VOLTAGE RANGE OF Vin | | MN1 | MN2 | MP1 | MP2 | Vn1 | Vn2 | Vout |
|---|---|---|---|---|---|---|---|---|---|---|
| DURING INITIAL POWER SUPPLY | (1) | EQUAL TO OR GREATER THAN 0 V | LESS THAN \|Vtn\| | ON | OFF | OFF | OFF | Vin | Vin | 0V |
| | (2) | EQUAL TO OR GREATER THAN \|Vtn\| | LESS THAN Vref−\|Vtn\| | ON | OFF | OFF | OFF | Vin | Vin | Vin − \|Vtn\| |
| | (3) | EQUAL TO OR GREATER THAN Vref−\|Vtn\| | LESS THAN Vref | OFF | OFF | OFF | OFF | Vref − \|Vtn\| | Vref − \|Vtn\| | Vin − \|Vtn\| |
| | (4) | TIMING AT WHICH Vin BECOMES EQUAL TO Vref | | OFF | ON | OFF | OFF | Vref − \|Vtn\| | Vref − \|Vtn\| | Vref − \|Vtn\| |
| DURING RISING OF Vin (Vin>Vref) | (5) | GREATER THAN Vref | LESS THAN Vref+\|Vtp\| | OFF | ON | OFF | OFF | Vout1 | floating | Vout1 |
| | (6) | EQUAL TO OR GREATER THAN Vref+\|Vtp\| | LESS THAN Vdd | OFF | ON | ON | OFF | Vout1 | Vin | Vout1 |
| | (7) | TIMING AT WHICH Vin BECOMES EQUAL TO Vdd | | OFF | ON | ON | OFF | Vout1 | Vdd | Vout1 |
| DURING DECREASING OF Vin | (8) | GREATER THAN Vref+\|Vtp\| | EQUAL TO OR LESS THAN Vdd | OFF | ON | ON | OFF | Vout1 | Vin | Vout1 |
| | (9) | GREATER THAN Vref | EQUAL TO OR LESS THAN Vref+\|Vtp\| | OFF | ON | OFF | OFF | Vout1 | Vref + \|Vtp\| | Vout1 |
| | (10) | GREATER THAN Vout1 | EQUAL TO OR LESS THAN Vref | OFF | OFF | OFF | OFF | floating | Vref + \|Vtp\| | Vout1 |
| | (11) | GREATER THAN Vout1−\|Vtn\| | EQUAL TO OR LESS THAN Vout1 | ON | OFF | OFF | OFF | Vin | Vref + \|Vtp\| | Vout1 |
| | (12) | GREATER THAN 0 V | EQUAL TO OR LESS THAN Vout1−\|Vtn\| | ON | OFF | OFF | ON | Vin | sharing | sharing |
| | (13) | TIMING AT WHICH Vin BECOMES EQUAL TO 0 V | | ON | OFF | OFF | ON | 0V | Vout2 | Vout2 |
| DURING RISING OF Vin (SECOND TIME) | (14) | EQUAL TO OR GREATER THAN 0 V | LESS THAN Vout2−\|Vtp\| | ON | OFF | OFF | ON | Vin | Vout2 | Vout2 |
| | (15) | EQUAL TO OR GREATER THAN Vout2−\|Vtp\| | LESS THAN Vout2 | ON | OFF | OFF | OFF | Vin | Vout2 | Vout2 |
| | (16) | EQUAL TO OR GREATER THAN Vout2 | LESS THAN Vref | OFF | OFF | OFF | OFF | Vout2 | floating | Vout2 |
| | (17) | EQUAL TO OR GREATER THAN Vref | LESS THAN Vref+\|Vtp\| | OFF | OFF | OFF | OFF | Vout2 | floating | Vout2 |
| | (18) | EQUAL TO OR GREATER THAN Vref+\|Vtp\| | LESS THAN Vdd | OFF | ON | ON | OFF | Vout2 | Vin | Vout2 |
| | (19) | TIMING AT WHICH Vin BECOMES EQUAL TO Vdd | | OFF | ON | ON | OFF | Vout2 | Vdd | Vout2 |

STEP-DOWN CIRCUIT

CROSS-REFERENCE TO RELATED APPLICATION

This application is based upon and claims the benefit of priority from Japanese Patent Application No. 2016-051270, filed Mar. 15, 2016, the entire contents of which are incorporated herein by reference.

FIELD

Embodiments described herein relate generally to a step-down circuit, in particular, a step-down circuit formed of transistors having relatively low breakdown voltages.

BACKGROUND

In the related art, transistors having breakdown voltages different from each other are used in an integrated circuit in some cases. For example, when a signal having a relatively high voltage level is output towards a transistor having a relatively low breakdown voltage, it is necessary to shift (lower) the voltage level of the signal by using a transistor having a relatively high breakdown voltage.

To perform the level shift, a step-down circuit can be employed. That is, transistors used in the step-down circuit may need to have a breakdown voltage higher than input voltages supplied thereto.

The breakdown voltage of a transistor may be adjusted by varying the gate film thickness of the transistor. However, this complicates the manufacturing process because manufacturing transistors with varying gate thicknesses is more difficult than manufacturing transistors with the same gate thickness.

DESCRIPTION OF THE DRAWINGS

FIG. 5 is a table illustrating states of respective transistors and nodes in each period or at each timing (1) to (19) in FIG. 4.

DETAILED DESCRIPTION

An embodiment provides a step-down circuit that can reliably operate with a transistor which has a breakdown voltage lower than an input voltage.

In general, according to an embodiment, a step-down circuit includes a first transistor of N-type having a channel between an input terminal and a first node, and a gate to which a reference voltage that is lower than a peak value of an AC voltage applied to the input terminal is applied, a second transistor of P-type having a channel between the input terminal and a second node, and a gate to which the reference voltage is applied, a third transistor of N-type having a channel between the first node and an output terminal, and a gate to which the AC voltage is applied, a fourth transistor of P-type having a channel between the second node and the output terminal, and a gate to which the AC voltage is applied, a first capacitor connected between the first node and the second node, and a second capacitor connected between the output terminal and a reference potential terminal.

First Embodiment

Figure 1:
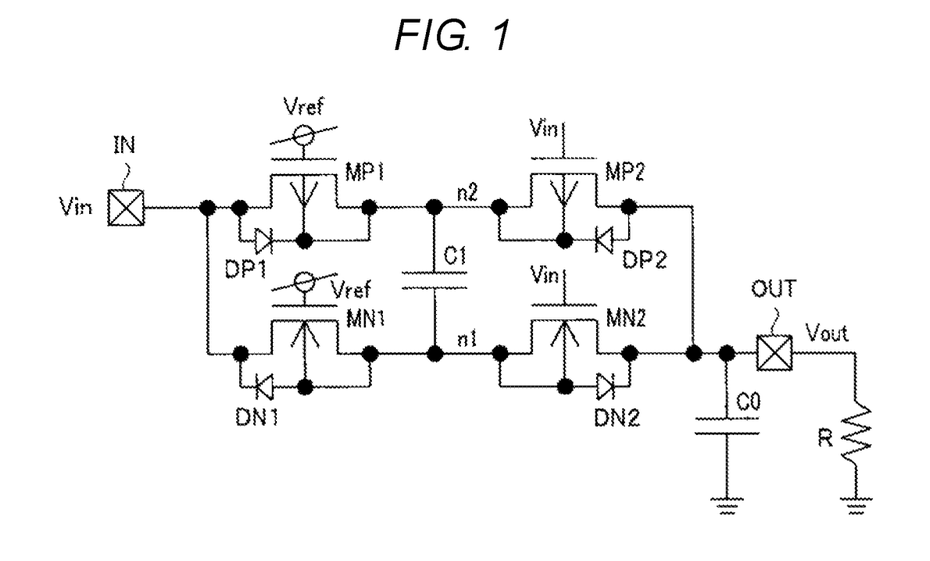
FIG. 1 is a circuit diagram illustrating a step-down circuit according to a first embodiment.
Figure 2:
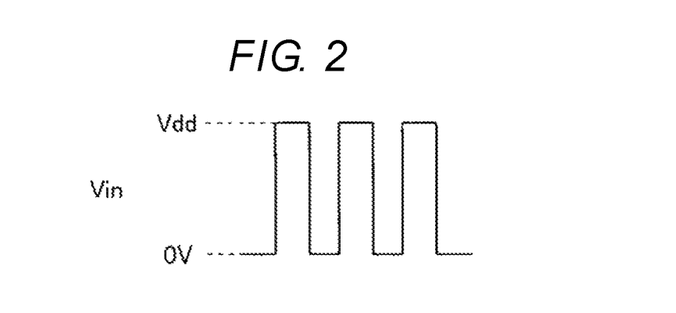
FIG. 2 is a waveform chart illustrating an example of an input voltage Vin.

FIG. 1 is a circuit diagram illustrating a step-down circuit according to a first embodiment. FIG. 2 is a waveform chart illustrating an example of an input voltage Vin. The step-down circuit according to the present embodiment is directed to stepping down a high supply voltage to a low voltage by using a transistor having a breakdown voltage tolerant to a low voltage. For example, in the present embodiment, it is assumed that a power supply voltage Vdd is stepped down to a half voltage Vref (=Vdd/2), but there is no limitation to the value of the stepped down voltage.

Figure 3:
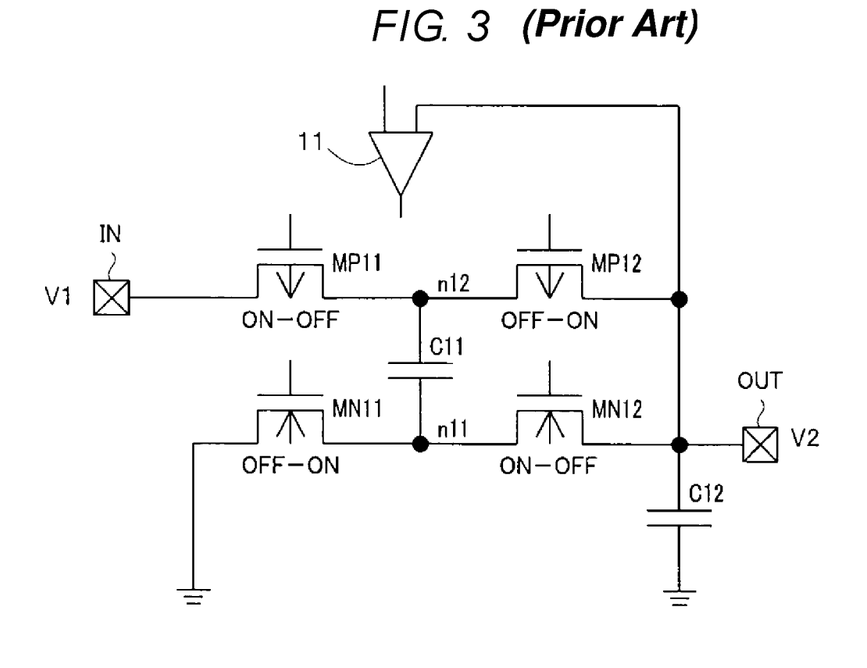
FIG. 3 is a circuit diagram illustrating a step-down circuit according to a comparative example.

First, a comparative example of a typically-employed step-down circuit will be described with reference to FIG. 3. FIG. 3 is a circuit diagram illustrating the step-down circuit according to the comparative example.

A power supply voltage V1 is applied to an input terminal IN. A source-to-drain path of a PMOS transistor MP11 is connected between the input terminal IN and a node n12. A capacitor C11 is connected between the node n12 and a node n11. A drain-to-source path of an NMOS transistor MN12 is connected between the node n11 and an output terminal OUT. The output terminal OUT is connected to a reference potential point through a capacitor C12. A voltage of the output terminal OUT is also applied to a control circuit 11.

In addition, a drain-to-source path of an NMOS transistor MN11 is connected between the node n11 and a reference potential point, and a source-to-drain path of a PMOS transistor MP12 is connected between the node n12 and the output terminal OUT.

The control circuit 11 performs a simultaneous on and off control of the transistors MP11 and MN12, and performs a simultaneous on and off control of the transistors MN11 and MP12. In addition, the control circuit 11 turns off the transistors MN11 and MP12 when the transistors MP11 and MN12 are turned on, and turns on the transistors MN11 and MP12 when the transistor MP11 and MN12 are turned off.

When the transistors MP11 and MN12 are turned on and the transistors MN11 and MP12 are turned off by the control circuit 11, the capacitors C11 and C12 are connected in series between the input terminal IN and the reference potential point. When the capacitors C11 and C12 have the same capacitance, an output voltage V2 at the output terminal OUT between the capacitors C11 and C12 becomes a value, which is ½ times the power supply voltage V1 supplied to the input terminal IN.

In addition, when the transistors MN11 and MP12 are turned on and the transistors MP11 and MN12 are turned off by the control circuit 11, the capacitors C11 and C12 are connected in parallel between the reference potential point and the output terminal OUT. As a result, a charge is supplied to the capacitor C12 from the capacitor C11, and thus terminal voltages of the capacitors C11 and C12 becomes the same as each other. When the control circuit 11 appropriately sets a switching period of the transistors, the voltage V2 at the output terminal OUT becomes a value, which is ½ times the power supply voltage V1.

In the comparative example of FIG. 3, the control circuit 11 applies the same voltage as the power supply voltage V1 to a gate that is a control terminal of each of the transistors MP11, MP12, MN11, and MN12 so as to reliably switch the transistors MP11, MP12, MN11, and MN12. That is, the voltage V1 is applied between a gate and a source of each of the transistors and between a drain and the source of the transistor from time after input of the power supply voltage V1 is initiated until the voltage V2 of the output terminal OUT becomes ½ times the power supply voltage V1. That is, in the comparative example of FIG. 3, even when the output voltage V2 is ½ of V1, it is necessary that the transistors MP11, MP12, MN11, and MN12 have a breakdown voltage greater than the voltage V1. In addition, in the comparative example of FIG. 3, it is necessary to provide a control circuit to drive the transistors MP11, MP12, MN11, and MN12, and thus a circuit configuration becomes complicated.

In contrast, according to the present embodiment, the control circuit is not necessary, and a step-down circuit, which steps down a power supply voltage Vdd to Vref (=Vdd/2), using transistors having a breakdown voltage higher than the voltage Vref (=Vdd/2). For example, when Vdd is 3 V, a DC voltage Vref (=1.5 V) can be output by the step-down circuit.

In FIG. 1, an input voltage Vin is applied to an input terminal IN. The input voltage Vin is an AC voltage in which a peak value is Vdd and a voltage value varies in a range of 0 to Vdd. For example, the AC voltage, which varies in the range of 0 to Vdd, may be obtained by converting a DC power supply voltage Vdd into an AC voltage using an oscillator and the like.

FIG. 2 is a waveform chart illustrating an example of the input voltage Vin. The example in FIG. 2 illustrates a pulsated voltage waveform that varies in a range of 0 to Vdd. However, the waveform of the input voltage Vin is not limited to the rectangular shape as shown in FIG. 2f, and may be a sinusoidal shape and a triangular shape.

A drain (first terminal)-to-source (second terminal) path as a current path of a NMOS transistor MN1 is connected between an input terminal IN and a node n1, and a drain-to-source path of a PMOS transistor MP1 is connected between the input terminal IN and a node n2. Each of the transistors MN1 and MP1 has a four-terminal structure with a back gate, and the back gate and the source of each transistor are connected to each other. In addition, parasitic diodes DN1 and DP1 are respectively formed in the transistors MN1 and MP1 at a position between the back gate and the drain.

In the present embodiment, Vref (=Vdd/2) is applied to gates of the transistors MP1 and MN1.

A capacitor C1 is connected between the node n1 and the node n2.

A source-to-drain path of an NMOS transistor MN2 is connected between the node n1 and an output terminal OUT, and a source-to-drain path of a PMOS transistor MP2 is connected between the node n2 and the output terminal OUT. Each of the transistors MN2 and MP2 has a four-terminal structure with the back gate, and the back gate and the source of each transistor are connected to each other. In addition, parasitic diodes DN2 and DP2 are respectively formed in the transistors MN2 and MP2 at a position between the back gate and the drain.

In the present embodiment, the input voltage Vin is applied to gates of the transistors MP2 and MN2.

A capacitor C0 is connected between the output terminal OUT and a reference potential point. Furthermore, a load (resistor) R is connected to the output terminal OUT.

In the present embodiment, all of the transistors MP1, MP2, MN1, and MN2 include an element having a breakdown voltage greater than the voltage Vref (=Vdd/2) (and smaller than Vdd).

As described above, FIG. 1 illustrates an example in which each of the transistors MP1, MP2, MN1, and MN2 has a four-terminal structure with the back gate, and the parasitic diodes DP1, DP2, DN1, and DN2 are respectively formed in the transistors at a position between the back gate and the drain. However, in the respective transistors, the back gate and the parasitic diode are not required.

In addition, in the present embodiment, the capacitance of the capacitor C0 and the capacitance of the capacitor C1 may not be equal to each other. The capacitance C0 of the capacitor C0 may be a relatively large capacitance value in consideration of driving of the load R. That is, the capacitance C0 of the capacitor C0 may be significantly larger than the capacitance C1 of the capacitor C1 (i.e., C0>>C1).

Figure 4:
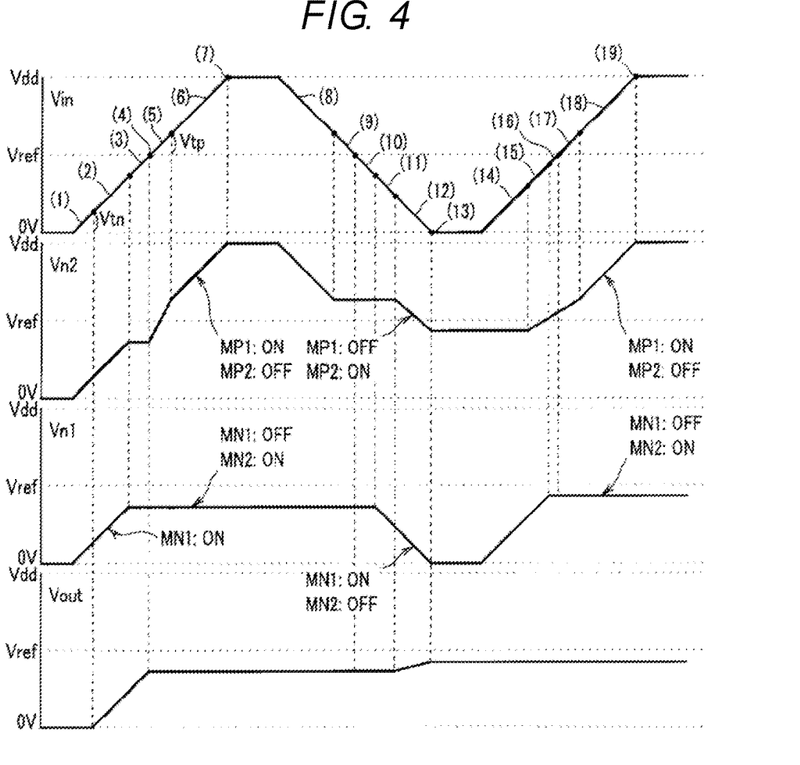
FIG. 4 is a timing chart illustrating node voltages of the step-down circuit during an operation according to the first embodiment.

Next, an operation of the step-down circuit according to the present embodiment configured as described above will be described with reference to FIG. 4 and FIG. 5. FIG. 4 is a timing chart illustrating the operation of the step-down circuit, and FIG. 5 is a table illustrating states of respective transistors and nodes in each period or at each timing in (1) to (19) in FIG. 4.

FIG. 4 illustrates variations in the input voltage Vin, a voltage Vn2 of the node n2, a voltage Vn1 of the node n1, and the output voltage Vout of the output terminal OUT in a descending order. The input voltage Vin is the pulsated voltage illustrated in FIG. 2, and the input voltage Vin in FIG. 4 illustrates a transition of values in a period in which the pulse-shaped input voltage Vin rises and a period in which the pulse-shaped input voltage Vin decreases.

Furthermore, here, a threshold voltage of the transistors MN1 and MN2 is set as Vtn, and a threshold voltage of the transistors MP1 and MP2 is set as Vtp, a forward voltage drop of each of the parasitic diodes DN1 and DN2 is set as Vfn, and a forward voltage drop of each of the parasitic diodes DP1 and DP2 is set as Vfp. In addition, a relationship of |Vtn|<|Vfn| and a relationship of |Vtp|<|Vfp| are assumed.

The capacitance C1 and the capacitance C0 of the capacitors C1 and C0 are assumed to satisfy a relationship of C0>>C1. Also, it is assumed that charging and discharging time of the capacitors C1 and C0, and a voltage variation due to capacitive coupling are made into consideration only in periods (1) and (2) of a rising period of the voltage Vn2 in FIG. 4 and FIG. 5, and that the charging and discharging time and the voltage variation due to the capacitive coupling in the other periods are ignored. In addition, the input voltage Vin is an AC voltage that varies in a range of 0 to Vdd.

Vref is applied to the gate of the transistor MN1. The transistor MN1 is turned on when the input voltage Vin is in a range of 0 to Vref−|Vtn|, and is turned off in the other ranges. Similarly, Vref is applied to the gate of the transistor MP1. The transistor MP1 is turned on when the input voltage Vin is in a range of Vref+|Vtp| to Vdd, and is turned off in the other ranges.

In addition, Vin is applied to the gate of the transistor MN2. The transistor MN2 is turned on when Vin is in a range satisfying a relationship of Vin≥Vn1+|Vtn|, and is turned off in the other ranges. Similarly, Vin is applied to the gate of the transistor MP2, and the transistor MP2 is turned on when Vin is in a range satisfying a relationship of Vin≤Vn2+|Vtp|, and is turned off in the other ranges.

In the period in which the transistors MN1 and MP1 are turned on, a voltage of each source becomes a value corresponding to a voltage of each drain. Also, in the period in which the transistors MN2 and MP2 are turned on, a voltage of each drain becomes a value corresponding to a voltage of each source. However, even when each of the transistors MN1 and MP1 is turned off, an effect of the drain voltage appears at the voltage of each source due to each of the parasitic diodes DN1 and DP1, a weak inversion region of each of the transistors, a leakage current, and the like. Similarly, even when each of the transistors MN2 and MP2 is turned off, an effect of the source voltage appears at the voltage of each drain due to each of the parasitic diodes DN2 and DP2, a weak inversion region of each of the transistors, a leakage current, and the like.

FIG. 4 illustrates a voltage variation including the effect of the parasitic diode. Furthermore, even when the effect of the parasitic diode does not exist, the output voltage Vout becomes the same as the values shown in FIG. 4.

(1) in FIG. 4 is a period in which rising of the input voltage Vin from 0 V is initiated at start of power supply, and Vin is equal to or greater than 0 V and less than |Vtn| as illustrated in FIG. 5. In this period, only the transistor MN1 is turned on. Accordingly, the voltage Vn1 of the node n1 becomes Vin, and rises in accordance with rising of Vin. The node n2 has the same potential as that of the node n1 due to capacitive coupling of the capacitor C1.

(2) is a period in which the input voltage Vin is equal to or greater than |Vtn| and is less than Vref−|Vtn|. In this period, the transistor MN1 is turned on. In the transistor MN2, the gate and the drain have the same potential, and the transistor MN2 is turned off. However, the output voltage Vout of the output terminal OUT becomes approximately Vin−|Vtn| due to an effect of the parasitic diode DN2 and the like. As a result, charging of the capacitor C0 is initiated.

(3) is a period in which the input voltage Vin is equal to or greater than Vref−|Vtn|, and less than Vref. In this period, the transistor MN1 is turned off. As a result, the voltage Vn1 of the node n1 is clamped to be a voltage of Vref−|Vtn|.

(4) is timing at which the input voltage Vin becomes equal to Vref. Even at this timing, the voltage Vn1 is Vref−|Vtn|. At this timing, the transistor MN2 is completely turned on. As a result, the voltage Vout has the same potential as the voltage Vn1 (=Vref−|Vtn|), and initial charging of the capacitor C0 is completed.

(5) is a period in which the input voltage Vin is greater than Vref and less than Vref+|Vtp|. In this period, the transistor MP1 is not completely turned on yet, and the voltage Vn2 of the node n2 enters a floating state. However, the drain voltage (voltage Vn2) of the transistor MP1 rises due to an effect of the parasitic diode DP1 and the like. Furthermore, in FIG. 5, a relationship of Vref−|Vtn|=Vout1 is illustrated.

(6) is a period in which the input voltage Vin is equal to or greater than Vref+|Vtp| and less than Vdd. In this period, the transistor MP1 is completely turned on. As a result, the voltage Vn2 becomes equal to Vin, and charging of the capacitor C1 is initiated.

(7) is timing at which the input voltage Vin becomes equal to Vdd. At this timing, the transistor MP1 is turned on and the voltage Vn2 is Vdd. In addition, charging of the capacitor C1 is completed. Furthermore, the amount of charge Q1 that is charged to the capacitor C1 satisfies a relationship of Q1=C1 (Vdd−Vout1).

(8) is a period in which the input voltage Vin starts to decrease, and the voltage Vin is greater than Vref+|Vtp| and equal to or less than Vdd. In this period, the voltage Vn2 decreases in accordance with decrease of the voltage Vin. On the other hand, the voltage Vn1 also decreases due to capacitive coupling, but the voltage Vn1 is maintained to approximately Vout1 because the capacitance C0 is significantly greater than the capacitance C1.

(9) is a period in which the input voltage Vin is greater than Vref and equal to or less than Vref+|Vtp|. In this period, the transistor MP1 is turned off. As a result, the voltage Vn2 is clamped to be a voltage of Vref+|Vtp|.

(10) is a period in which the input voltage Vin is greater than Vout1 and equal to or less than Vref. In this period, the transistor MN2 is turned off. In addition, the transistor MN1 is not completely turned on, but the transistor enters a floating state in which a source potential decreases due to an effect of the parasitic diode DN1 and the like.

(11) is a period in which the input voltage Vin is greater than Vout1−|Vtn| and equal to or less than Vout1. In this period, the transistor MN1 is turned on. As a result, the voltage Vn1 becomes equal to Vin.

(12) is a period in which the input voltage Vin is greater than 0 V and equal to or less than Vout1−|Vtn|. In this period, the transistor MP2 is turned on. The transistor MN1 is turned on, and the capacitors C1 and C0 are connected in series between the input terminal IN and the reference potential point. A charge that is retained to the capacitor C1 flows to the capacitor C0, and discharging of the capacitor C1 and charging of the capacitor C0 are initiated.

(13) is timing at which the input voltage Vin becomes 0 V. The transistors MN1 and MP2 are turned on, and the discharging of the capacitor C1 is completed. The capacitor C0 and the capacitor C1 of the capacitors C0 and C1 satisfy a relationship of C0>>C1. Accordingly, a terminal voltage of the capacitor C0, that is, the voltage Vout (=Vout2), of the output terminal OUT, is expressed by the following Expression (1) in which a voltage value obtained through capacitive division of the terminal voltage of the capacitor C1 before charging and discharging of the capacitors C0 and C1 is added to the terminal voltage of the capacitor C0.

$$Vout2 = Vout1 + (C1/C0) \cdot (Vdd - Vref + |Vtn|) \quad (1)$$

The voltage Vout2 in Expression (1) is slightly higher than Vref−|Vtn| and is slightly lower than the voltage Vref that is ½ times the input voltage Vin.

(14) is a period in which second pulse input of the input voltage Vin is initiated, and the input voltage Vin is equal to or greater than 0 V and less than Vout−|Vtp|. In this period, the transistors MN1 and MP2 are turned on. The voltage Vn1 of the node n1 is Vin, and rises in accordance with rising of Vin.

(15) is a period in which the input voltage Vin is equal to or greater than Vout2−|Vtp| and less than Vout2. In this period, the transistor MP2 is turned off. The node n2 increases due to the capacitive coupling of the capacitor C1 similar to the node n1, but a relationship of C0>>C1 is maintained, and the voltage Vn2 is approximately Vout2.

(16) is a period in which the input voltage Vin is equal to or greater than Vout2 and less than Vref. In this period, all of the transistors MP1, MP2, MN1, and MN2 are turned off. As a result, the voltage Vn1 is clamped to be a voltage of Vout2. In addition, the node n2 enters a floating state.

(17) is a period in which the input voltage Vin is equal to or greater than Vref and less than Vref+|Vtp|. In this period, the transistor MP1 is not completely turned on yet, and the node n2 enters a floating state. However, the drain voltage (voltage Vn2) of the transistor MP1 rises due to an effect of the parasitic diode DP1 and the like.

(18) is a period in which the input voltage Vin is equal to or greater than Vref+|Vtp| and less than Vdd. In this period, the transistor MP1 is completely turned on. As a result, the voltage Vn2 becomes equal to Vin, and charging of the capacitor C1 is initiated.

(19) is timing at which the input voltage Vin becomes equal to Vdd. At this timing, the transistor MP1 is turned on and the voltage Vn2 is Vdd. In addition, charging of the capacitor C1 is completed. Furthermore, the amount of charge Q1 that is charged to the capacitor C1 satisfies a relationship of Q1=C1 (Vdd−Vout2).

Then, the same operation is repeated. That is, when the input voltage Vin lowers and becomes 0 V, the transistors MN1 and MP2 are turned on, and discharging of the capacitor C1 is terminated. A relationship of C0>>C1 is satisfied, and thus a terminal voltage of the capacitor C0, that is, the voltage Vout (=Vout3) of the output terminal OUT is expressed by the following Expression (2).

$$Vout3=Vout2+(C1/C0)\cdot(Vdd-Vref+|Vtn|) \qquad (2)$$

That is, whenever a pulse of the input voltage Vin is input, the output voltage Vout rises by (C1/C0)·(Vdd−Vref+|Vtn|), and finally becomes close to the voltage Vref.

As described above, according to the present embodiment, it is possible to step down the input voltage Vin to the DC voltage Vref having a half amplitude by using the step-down circuit in FIG. 1. In addition, Vref is applied to the gates of the transistors MN1 and MP1, and the input voltage Vin, the voltage Vn1 of the node n1, and the voltage Vn2 of the node n2 vary in a range of 0 to Vdd. Accordingly, only a voltage, which is equal to or less than Vref, is applied between the gate and the source, between the gate and the drain, and between the source and the drain of the transistors MN1 and MP1. Accordingly, it is possible to employ a transistor having a breakdown voltage higher than the voltage Vref (and lower than Vdd) as the transistors MN1 and MP1.

In addition, voltages between the gate and source, between the gate and the drain, and between the source and drain of the transistors MN1 and MP1 are a voltage difference between the voltage Vin and the voltage Vn1, a voltage difference between the voltage Vin and the voltage Vn2, and a voltage difference between the voltage Vin and the voltage Vout, respectively. As all of the voltage differences are within Vref+|Vtn| or Vref+|Vtp|, it is possible to employ a transistor having a breakdown voltage higher than approximately the voltage Vref (and lower than Vdd) as the transistors MN1 and MP1. As described above, as all of the transistors MN1, MN2, MP1, and MP2, it is possible to employ a transistor having a breakdown voltage higher than the voltage Vref (and lower than Vdd).

In addition, in the present embodiment, a relationship of C0>>C1 is set. That is, even when employing a capacitor having small capacitance as the capacitor C1, it is possible to secure sufficient load driving capability by increasing capacitance of the capacitor C0.

Second Embodiment

Figure 6:
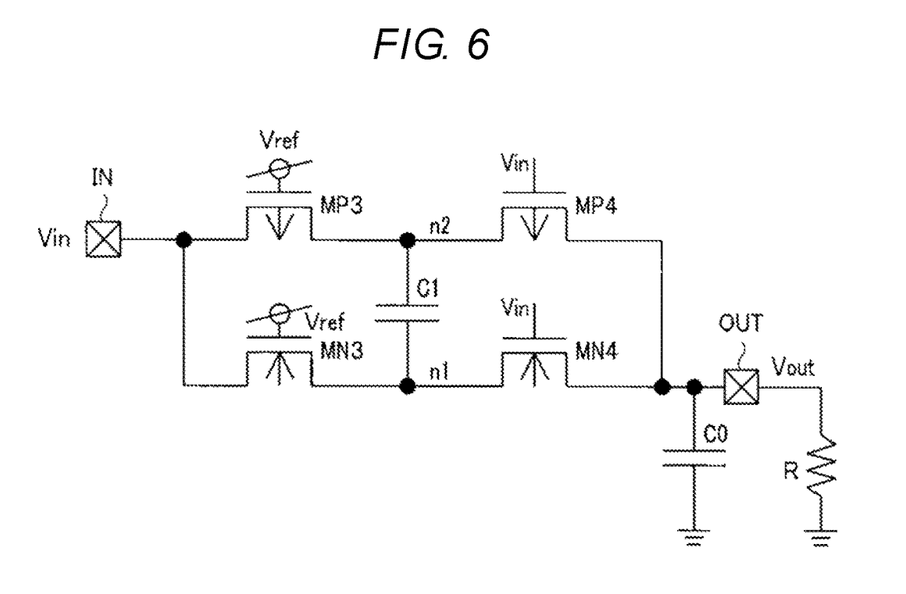
FIG. 6 is a circuit diagram illustrating a step-down circuit according to a second embodiment.

FIG. 6 is a circuit diagram illustrating a step-down circuit according to a second embodiment. In FIG. 6, the same reference numerals will be used for the same elements as those in FIG. 1, and description thereof will be omitted. A step-down circuit according to the present embodiment is different from the step-down circuit in FIG. 1 in that transistors MN3, MN4, MP3, and MP4 are included instead of the transistors MN1, MN2, MP1, and MP2.

Each of the transistors MN3, MN4, MP3, and MP4 has a three-terminal structure. This configuration is different from that of the transistors MN1, MN2, MP1, and MP2. In NMOS transistor MN3, Vref is applied to a gate, a source is connected to an input terminal IN, and a drain is connected to a node n1. In a PMOS transistor MP3, Vref is applied to a gate, a source is connected to the input terminal IN, and a drain is connected to a node n2. In an NMOS transistor MN4, Vin is applied to a gate, a source is connected to an output terminal OUT, and a drain is connected to the node n1. In a PMOS transistor MP4, Vin is applied to a gate, a source is connected to the output terminal OUT, and a drain is connected to the node n2.

The other configurations are the same as in FIG. 1.

Also in the present embodiment configured as described above, the operation of the transistors MN3, MN4, MP3, and MP4, and the voltage variations of the nodes n1 and n2 and the output terminal OUT are basically the same as in the timing chart of FIG. 4 and the table of FIG. 5. In the present embodiment, a current path by a parasitic diode is not formed between the source and the drain of the transistors MN3, MN4, MP3, and MP4. Accordingly, an operation of the transistors MN3, MN4, MP3, and MP4 during transition from ON to OFF or during transition from OFF to ON is slightly different from the operation illustrated in FIG. 4 and FIG. 5. However, also in this case, the voltage variations of the nodes n1 and n2 and the output terminal OUT occur in approximately the same manner as in FIG. 4 and FIG. 5 due to a weak inversion region of each of the transistors, a leakage current, and the like.

Accordingly, also according to the present embodiment, it is possible to obtain the same advantage as in the first embodiment.

Modification Example

Figure 7:
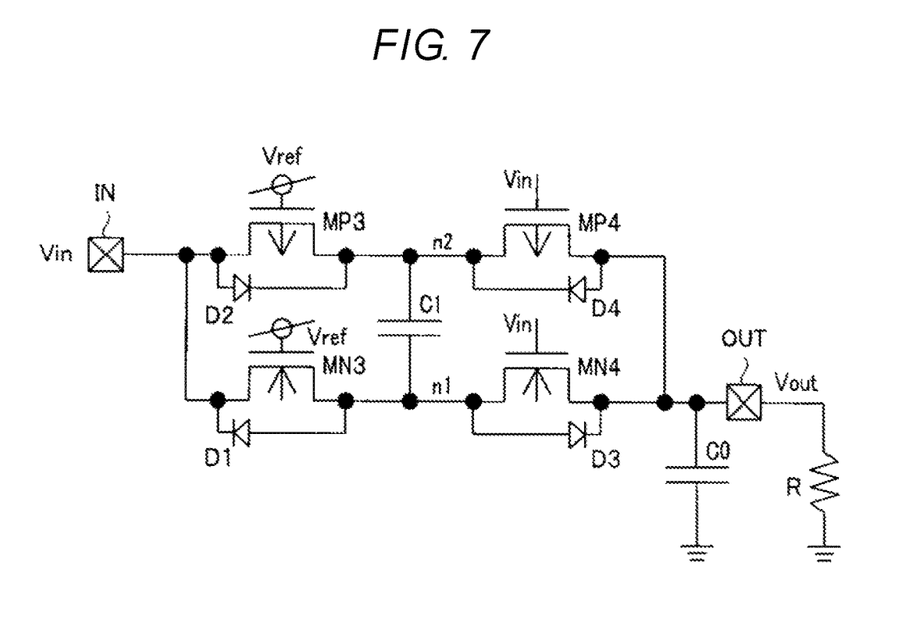
FIG. 7 is a circuit diagram illustrating a step-down circuit according to a modification example.

FIG. 7 is a circuit diagram illustrating a step-down circuit according to a modification example of the first and second embodiments. In FIG. 7, the same reference numerals will be used for the same elements as those in FIG. 6, and description thereof will be omitted. The step-down circuit shown in FIG. 7 includes diodes D1 to D4.

As illustrated in FIG. 7, even when the diodes D1 to D4 are used instead of a parasitic diode, and are connected between the source and the drain of each of the transistors MN3, MN4, MP3, and MP4, it is possible to configure a step-down circuit having the same function as in the first and second embodiments.

Third Embodiment

Figure 8:
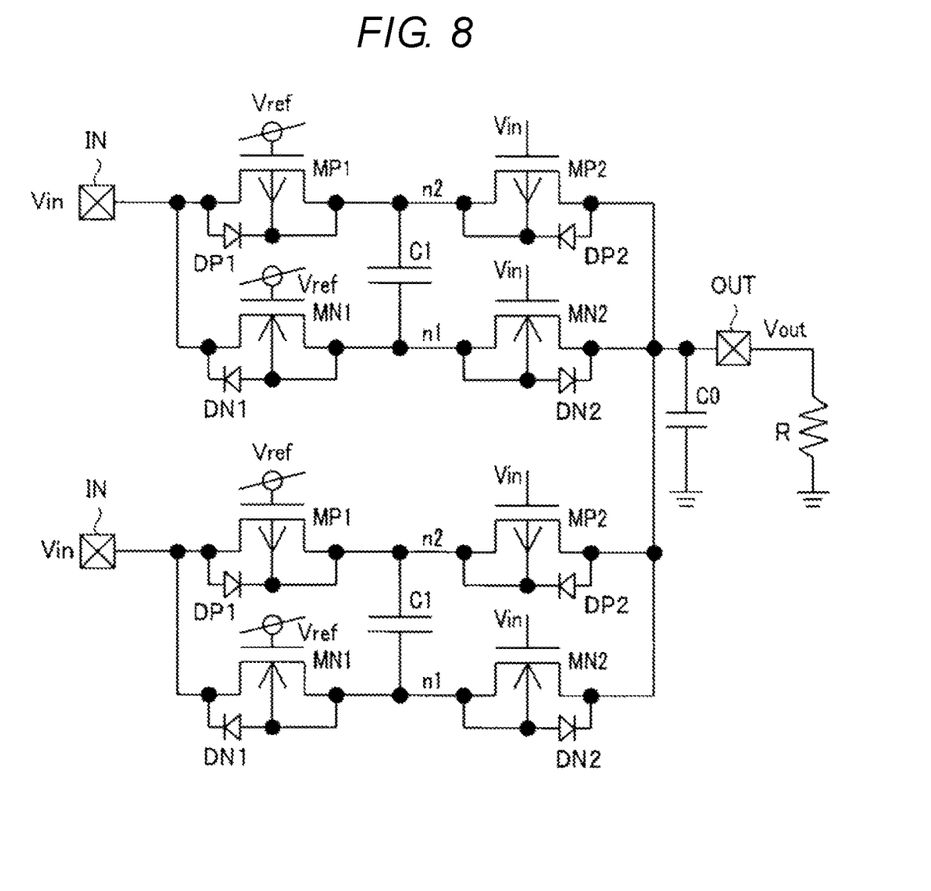
FIG. 8 is a circuit diagram illustrating a step-down circuit according to a third embodiment.

FIG. 8 is a circuit diagram illustrating a step-down circuit according to a third embodiment. In FIG. 8, the same reference numerals will be used for the same elements as those in FIG. 1, and description thereof will be omitted. A step-down circuit according to the present embodiment includes two sets of step-down circuits having the same configuration as the step-down circuit in FIG. 1. In FIG. 8, an input voltage Vin is supplied to one of two input terminals IN, and an input voltage /Vin inverted from the input voltage Vin is supplied to the other input terminal IN. In addition, the capacitor C0 on one side is omitted, and the output terminal OUT is shared.

According to the present embodiment configured as described above, the respective step-down circuits operate in the same manner as those shown in FIG. 4 and FIG. 5. Input voltages Vin and /Vin, which are inverted from each other, are input to the respective input voltages VIN, and the voltage Vout of the output terminal OUT becomes a voltage Vref, which is a half of the input voltage Vin. That is, also in a case of two-phase AC input, the step-down circuits operate in the same manner as in the first and second embodiments.

Furthermore, when the input voltages are two-phase AC inputs which are inverted from each other, a difference between Vout1 to Vout3, and Vref is canceled, and thus it is possible to obtain the voltage Vref that is a half of the input voltage Vin in shorter time.

As described above, according to the present embodiment, it is possible to obtain the same advantage as in the above-described embodiments.

Fourth Embodiment

Figure 9:
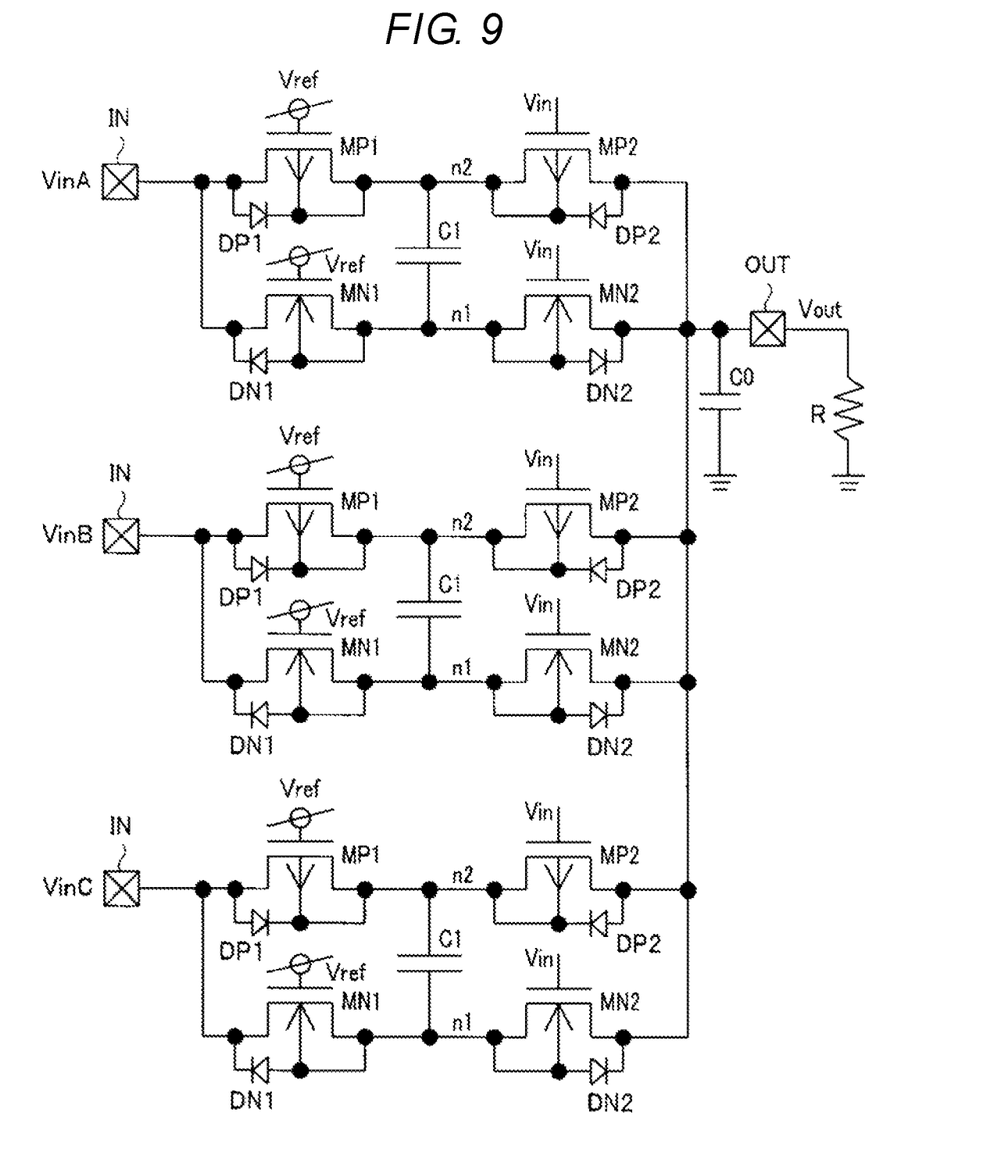
FIG. 9 is a circuit diagram illustrating a step-down circuit according to a fourth embodiment.

FIG. 9 is a circuit diagram illustrating a step-down circuit according to a fourth embodiment. In FIG. 9, the same reference numerals will be used for the same elements as those in FIG. 1, and description thereof will not be repeated. The step-down circuit according to the present embodiment includes three sets of step-down circuits having the same configuration as that in FIG. 1. In FIG. 9, an input voltage VinA is supplied to one of three input terminals IN, an input voltage VinB is supplied to another input terminal IN, and an input voltage VinC is supplied to the other input terminal IN. The input voltages VinA to VinC are three-layer alternating currents different in phase by 120°. In addition, two among three capacitors C0 are omitted, and an output terminal OUT is shared.

According to the present embodiment configured as described above, the respective step-down circuits operate in the same manner as those shown in FIG. 4 and FIG. 5. Three-phase input voltages Vin different in phase by 120° are respectively input to the input terminals Vin, and the voltage Vout of the output terminal OUT becomes a voltage Vref, which is a half of the input voltages Vin. That is, also in a case of three-phase AC input, the step-down circuits can operate in the same manner as in the first and second embodiments.

As described above, according to the present embodiment, it is possible to obtain the same advantage as in the above-described embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A step-down circuit, comprising:
input and output terminals;
a first transistor of N-type having a channel between an input terminal and a first node, and a gate to which a reference voltage is applied, wherein the reference voltage is lower than a peak value of an AC voltage applied to the input terminal;
a second transistor of P-type having a channel between the input terminal and a second node, and a gate to which the reference voltage is applied;
a third transistor of N-type having a channel between the first node and the output terminal, and a gate to which the AC voltage is applied;
a fourth transistor of P-type having a channel between the second node and the output terminal, and a gate to which the AC voltage is applied;
a first capacitor connected between the first node and the second node; and
a second capacitor connected between the output terminal and a reference potential terminal.

2. The step-down circuit according to claim 1, wherein sources of the first and third transistors are connected to the first node, and
sources of the second and fourth transistors are connected to the second node.

3. The step-down circuit according to claim 2, wherein each of the first, second, third, and fourth transistors includes a back gate connected to a source thereof.

4. The step-down circuit according to claim 1, wherein, during operation:
a first parasitic diode that allows a current flow from the first node to the input terminal is formed between the first node and the input terminal;
a second parasitic diode that allows a current flow from the input terminal to the second node is formed between the second mode and the input terminal;
a third parasitic diode that allows a current flow from the second node to the output terminal is formed between the first node and the output terminal; and
a fourth parasitic diode that allows a current flow from the output terminal and the second node is formed between the second node and the output terminal.

5. The step-down circuit according to claim 1, wherein a capacitance of the second capacitor is greater than a capacitance of the first capacitor.

6. The step-down circuit according to claim 1, wherein a breakdown voltage of each of the first, second, third, and fourth transistors is smaller than the peak value of the AC voltage.

7. The step-down circuit according to claim 1, wherein an output voltage of the output terminal approaches the reference voltage during operation of the step-down circuit.

8. A step-down circuit, comprising:
a first step-down circuit module connected between a first input terminal to which an AC voltage is applied and an output terminal;
a second step-down circuit module connected between a second input terminal to which a phase-shifted signal of the AC voltage is applied and the output terminal; and
a first capacitor connected between the output terminal and a reference potential terminal,
wherein each of the first and second step-down circuit modules includes:
a first transistor of N-type having a channel between an input terminal and a first node, and a gate to which a reference voltage is applied, wherein the reference voltage is lower than a peak value of AC voltage that is applied to the respective input terminal;
a second transistor of P-type having a channel between the input terminal and a second node, and a gate to which the reference voltage is applied;

a third transistor of N-type having a channel between the first node and an output terminal, and a gate to which the AC voltage is applied;
a fourth transistor of P-type having a channel between the second node and the output terminal, and a gate to which the AC voltage is applied; and
a second capacitor connected between the first node and the second node.

9. The step-down circuit according to claim 8, wherein a phase difference between the AC voltage and the phase-shifted signal of the AC voltage is 180°.

10. The step-down circuit according to claim 8, further comprising:
a third step-down circuit module connected between a third input terminal to which a phase-shifted signal of the AC voltage being applied to the third terminal, and
a phase difference between the AC voltages applied to any two of the first, second, and third input terminals is 120°.

11. The step-down circuit according to claim 8, wherein, in each of the first and second step-down circuit modules,
sources of the first and third transistors are connected to the first node, and
sources of the second and fourth transistors are connected to the second node.

12. The step-down circuit according to claim 11, wherein, in each of the first and second step-down circuit modules,
each of the first, second, third, and fourth transistors includes a back gate connected to a source thereof.

13. The step-down circuit according to claim 8, wherein a capacitance of the first capacitor is greater than a capacitance of the second capacitor in each of the first and second step-down circuit module.

14. The step-down circuit according to claim 8, wherein, in each of the first and second step-down circuit modules,
a breakdown voltage of each of the first, second, third, and fourth transistors is smaller than the peak value of the AC voltage.

15. A method for operating a step-down circuit including:
an input terminal to which an AC voltage is applied;
a first transistor of N-type having a channel between the input terminal and a first node;
a second transistor of P-type having a channel between the input terminal and a second node;
a third transistor of N-type having a channel between the first node and an output terminal of the step-down circuit;
a fourth transistor of P-type having a channel between the second node and the output terminal;
a first capacitor connected between the first node and the second node; and
a second capacitor connected between the output terminal and a reference potential terminal, wherein the method comprises the steps of:
applying a reference voltage that is lower than a peak value of the AC voltage to gates of the first and second transistors; and
applying the AC voltage to gates of the third and fourth transistors.

16. The method according to claim 15, wherein
sources of the first and third transistors are connected to the first node, and
sources of the second and fourth transistors are connected to the second node.

17. The method according to claim 16, wherein
each of the first, second, third, and fourth transistors includes a back gate connected to a source thereof.

18. The method according to claim 15, wherein
a capacitance of the second capacitor is greater than a capacitance of the first capacitor.

19. The method according to claim 15, wherein
a breakdown voltage of each of the first, second, third, and fourth transistors is smaller than the peak value of the AC voltage.

* * * * *